Patented Mar. 19, 1935

1,994,758

UNITED STATES PATENT OFFICE 1,994,758

PROCESS FOR BREAKING PETROLEUM EMULSIONS

Melvin De Groote, St. Louis, Mo., assignor to Tretolite Company, Webster Groves, Mo., a corporation of Missouri No Drawing. Application May 31, 1934,
Serial No. 728,287

8 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings."

The object of my invention is to provide a novel, inexpensive and efficient process for separating emulsions of the kind referred to into their component parts of oil and water or brine.

Briefly described, my process consists in subjecting a petroleum emulsion of the water-in-oil type, to the action of a treating agent or demulsifying agent of a particular kind or composition hereinafter described, thereby causing the emulsion to break down and separate into its component parts of oil and water or brine, when the emulsion is permitted to remain in a quiescent state after such treatment, or equivalent separatory procedure.

The treating agent or demulsifying agent used in my process consists of sulfonated dipolymer in the form of a sulfonic acid, or in the form of a salt, or in the form of an ester.

It has long been known that certain terpene hydrocarbons, particularly unsaturated ones, could be sulfonated so as to produce a sulfo-terpene. Sulfo-terpene or terpene sulfonic acid, as it is sometimes called, has had relatively limited application in the arts. An aqueous solution of terpene sulfonic acid, has a surface activity akin to sulfonic acids derived from mono-cyclic aromatics, such as benzene sulfonic acid, or phenol sulfonic acid. It is generally recognized that the aqueous solutions of polycyclic aromatic sulfonic acids, particularly alkylated polycyclic sulfonic acids or their salts, are much more surface active than a corresponding or somewhat similar alkylated or unalkylated mono-cyclic aromatic sulfonic acid or its salt. Likewise, sulfonated dipolymer shows the same substantial increase in surface activity of its aqueous solutions in comparison with sulfonated terpenes as the aforementioned polycyclic aromatic sulfonic acids show in comparison with the monocyclic aromatic sulfonic acids.

Dipolymer consists of polymerized terpene hydrocarbons. It is produced by the polymerization of dipentene, turpentine or pine oil by various methods. The terpenes obtained in producing terpeneless oil of lemon may be employed. One method of producing dipolymer is to heat the raw material with finely-divided, anhydrous, freshly prepared aluminum chloride in such a manner that there is continuous contact between the surface of the aluminum chloride and the raw material employed as a source of dipolymer. It is believed that under too drastic conditions polymerization may be carried to the point where a product is obtained, which, after sulfonation, does not yield a clear water-soluble solution, but contains a proportion of water-insoluble, presumably unsulfonated, tarry matter. It is preferable that the polymerization process be so conducted that the unsulfonatable or water-insoluble, tarry matter is not produced.

The sulfonation of dipolymer is best conducted by means of concentrated or fuming sulfuric acid, or by means of chlorsulfonic acid. Sulfonation must be conducted in such a manner that relatively little sulfur dioxide is formed. If the temperature rises too rapidly there is a pronounced, and perhaps, even a copious evolution of sulfur dioxide. This indicates oxidation of the dipolymer, as well as sulfonation. Generally speaking, it is desirable that the sulfonation be conducted at or below 35° C. until the sulfonated mass is completely water-soluble, preferably to give a clear solution. A higher temperature may be employed, but in any event, precautions must be taken against oxidation, as indicated by the evolution of any substantial amount of sulfur dioxide.

When sulfonation is complete, the sulfonated mass may be treated in the customary manner, as employed in the production of somewhat similar sulfonated or sulfated materials. The excess of sulfuric acid is removed by the conventional washing process with water or an aqueous solution. The amount of water or salt solution added to dilute the sulfuric acid should be the minimum necessary to give a separation, because sulfonated dipolymer shows some solubility in dilute sulfuric acid. In the absence of proper precautions, the yield of sulfonated dipolymer would be decreased.

The sulfonated dipolymer, previously washed and separated, may be used as such, or after neutralization with any suitable alkali, or basic material, such as caustic soda, caustic potash, strong ammonia water, sodium carbonate, potassium carbonate, ammonium carbonate, triethanolamine, or any similar amine having basic properties, etc. Sulfonated dipolymer may be neutralized with calcium oxide or magnesium oxide, or with the corresponding carbonates so as to produce the alkaline earth salts. The alkaline earth salts of sulfonated dipolymer exhibits some water solubility, and in many instances, the addition of small amounts of sodium or ammonium salts of sulfonated dipolymer to hard waters does not result in precipitation. Apparently, the solubility of the various salts of sulfonated dipolymer are related to the degree of polymerization, the source of the original terpene, and also to the possible presence of more than one sulfonic acid radical. It is believed that sulfonated dipolymer may, at times, have present disulfonic acids, as well as mono-sulfonic acids. The sulfonated dipolymer may be converted into an aliphatic, aromatic or cyclic ester by any one of the conventional methods. The ethyl, propyl or butyl esters may be employed. The esters thus formed may be water-soluble or oil-soluble. A water-soluble salt of sulfonated dipolymer, such as the sodium salt, may be reacted with a water-soluble metallic salt, such as ferrous sulfate, ferric chloride, copper sulfate, or the like, to produce a water-insoluble salt. For convenience, the amine and ammonium compounds are considered as being the equivalent of metallic salts. The expression "sulfonated dipolymer body" is here employed to mean the acids themselves or the salts or esters derived therefrom. The sulfonated dipolymer body may be used in a water-soluble form, or in the form of both oil and water solubility. Indeed, the sulfonated dipolymer body may be used in a form which ordinarily may be considered both oil and water-insoluble. This paradoxical statement is true, because in some instances as little as one part of sulfonated dipolymer body in 10,000 parts of emulsion, or even less, will destroy the stability of the emulsion, and materials frequently referred to as insoluble may really be soluble in such limited amounts, i. e., one part in 10,000.

It is known that some terpenes can combine chemically with more than two moles of a halogen for each mole of terpene. Presumably, such terpenes might be at least partially halogenated, polymerized and then sulfonated, to yield a peculiar sulfonated dipolymer having a halogen atom present. Such modifications, or similar ones, possessing, in the main, the properties of the conventional sulfonated dipolymer, are considered the equivalent thereof.

In practicing my process the above mentioned materials may be employed alone or in combination with other recognized demulsifying agents, such as water softeners, modified fatty acids, salts of petroleum sulfonic acids, naphthenic acids or salts thereof, alkylated aromatic sulfonic acids or salts thereof, derivatives of polybasic acids or salts thereof, or the like. These sulfonated dipolymer bodies, either alone or mixed with other conventional demulsifying agents, may be used after mixture with any suitable solvent, such as water, ethyl alcohol, methyl alcohol, denatured alcohol, propyl alcohol, butyl alcohol, cresylic acid, benzol, solvent naphtha, toluene, hard wood tar oil, creosote oil, anthracene oil, pine oil, turpentine, dipentene, pine tar oil, cymene, spruce turpentine, rosin oil, kerosene, hydrogenated naphthalene, sulfur dioxide extract derived from petroleum distillates, carbon tetrachloride, various chlorinated hydrocarbons, pine oil creosote, and the like.

My preferred treating agent or demulsifying agent consists of the ammonium salt of sulfonated dipolymer, and particularly, dipolymer obtained from polymerized pine oil. Although the ammonium salt of sulfonated dipolymer may be used in the form of an aqueous solution, I prefer to mix it with approximately two parts of pine oil and use this solution without aqueous dilution. This latter type of my preferred demulsifying agent is particularly effective when mixed with a proportion of partially neutralized sulfonated castor oil of the kind frequently employed for the treatment of petroleum emulsions. For instance, one may employ the following:

| | Parts by weight |
|---|---|
| Ammonium salt of sulfonated dipolymer | 30 |
| Pine oil | 60 |
| Partially neutralized sulfonated castor oil | 10 | of any suitable type which will combine to give a uniform solution with the other two components of the mixture.

In practising my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kind known as "tank bottoms", and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results.

In general, I have found that for an average petroleum emulsion, a ratio of 1 part of treating agent to 10,000 parts of emulsion will usually be found to produce commercially satisfactory results.

Having thus described my invention, what I claim as new and desire to secure by Letters Patent, is:

1. A process for breaking petroleum emulsions of the water-in-oil type, which consists in subjecting the emulsion to the action of a demulsifying agent containing a sulfonated dipolymer body.

2. A process for breaking petroleum emulsions of the water-in-oil type, which consists in subjecting the emulsion to the action of a demulsifying agent containing a dipolymer sulfonic acid.

3. A process for breaking petroleum emulsions of the water-in-oil type, which consists in subjecting the emulsion to the action of a demulsifying agent containing an ester of a dipolymer sulfonic acid.

4. A process for breaking petroleum emulsions of the water-in-oil type, which consists in subjecting the emulsion to the action of a demulsifying agent containing a salt of a dipolymer sulfonic acid.

5. A process for breaking petroleum emulsions of the water-in-oil type, which consists in subjecting the emulsion to the action of a demulsifying agent containing a water-soluble salt of a dipolymer sulfonic acid.

6. A process for breaking petroleum emulsions of the water-in-oil type, which consists in subjecting the emulsion to the action of a demulsifying agent containing an ammonium salt of a dipolymer sulfonic acid.

7. A process for breaking petroleum emulsions of the water-in-oil type, which consists in subjecting the emulsion to the action of a demulsifying agent containing an ammonium salt of a dipolymer sulfonic acid in admixture with pine oil.

8. A process for breaking petroleum emulsions of the water-in-oil type, which consists in subjecting the emulsion to the action of a demulsifying agent containing approximately 30 parts by weight of the ammonium salt of dipolymer sulfonic acid, 60 parts by weight of pine oil and 10 parts by weight of partially neutralized sulfonated castor oil.

MELVIN DE GROOTE.